United States Patent Office 3,092,949
Patented June 11, 1963

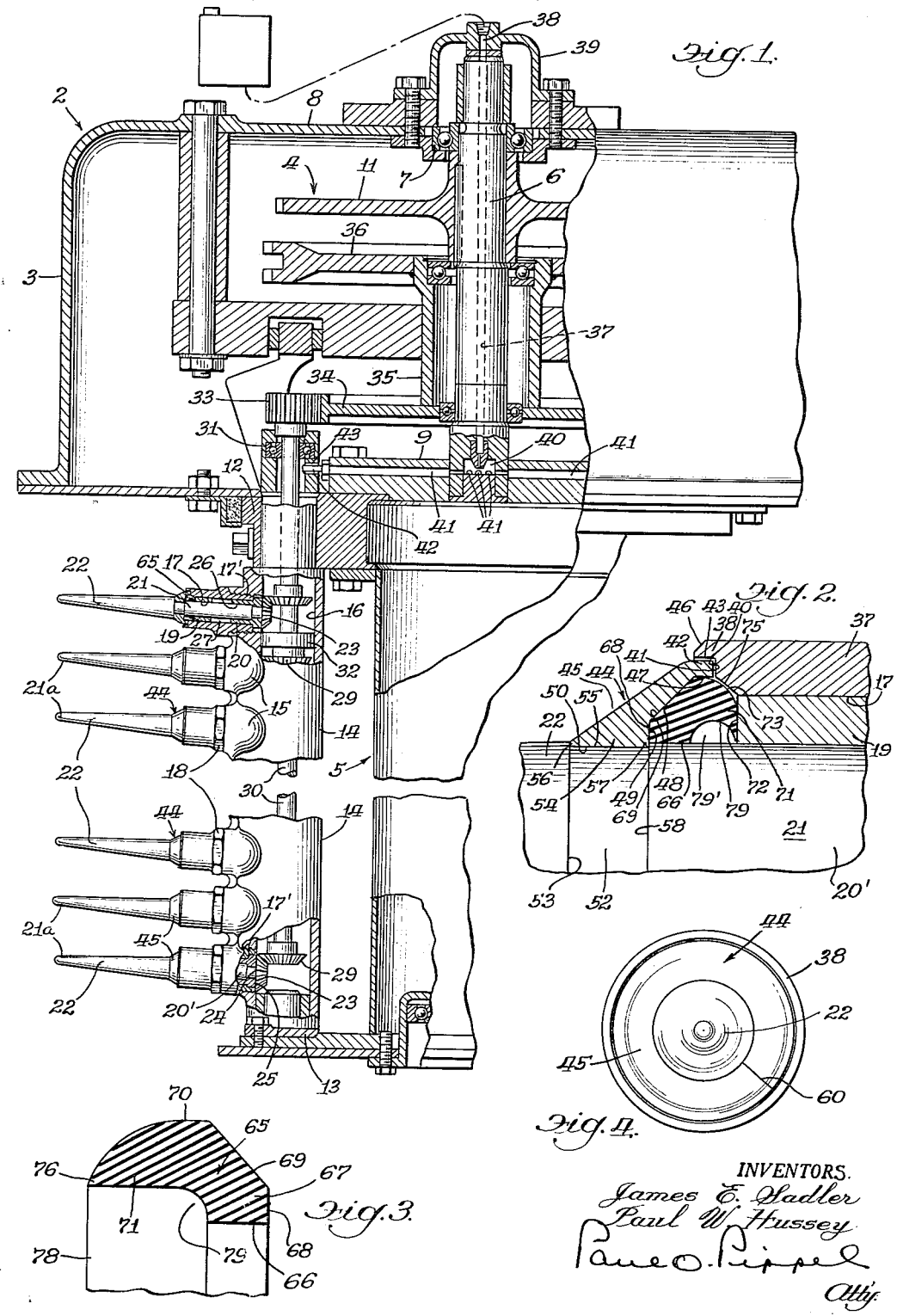

3,092,949
SEALED PICKER BAR AND SPINDLE ASSEMBLY
James E. Sadler, Memphis, Tenn., and Paul W. Hussey, Park Ridge, Ill., assignors to International Harvester Company, Chicago, Ill., a corporation of New Jersey
Filed June 29, 1960, Ser. No. 39,632
10 Claims. (Cl. 56—44)

This invention relates to a cotton harvester and more specifically to a sealed bar and cotton picker spindle assembly.

The invention is applicable to a type of cotton harvesting machine shown in U.S. Patent 2,140,631 and which currently is in field use and in production. In these types of machines considerable difficulty has been experienced in properly lubricating the driving train as well as the bearings which mount the vertical row of cotton picker spindles. In many instances a new owner of a cotton harvesting machine tends to over-lubricate and if he is using grease he encounters the problem of air locks which prevents the grease from distributing throughout the entire length of the picker bar and whether he uses grease or oil, if it is improperly done, this lubricant tends to wipe off onto the cotton which is being carried by the picker spindles so that it stains the cotton sample which seriously downgrades it. In order to minimize the effects of the lubricant the owner then tends to under-lubricate with consequent extensive damage or excessive wear to the spindles, the bearings and other working parts of the machine.

It is well understood that any of the approved lubricants is durable and is useful for many thousands of hours of work. The problem that has plagued the industry has been the lack of means for retaining the lubricant or for maintaining the lubricant clean so that grit and dirt is prevented from contaminating the lubricant after only a few hours of work.

A general object of the invention is to provide a novel sealed picker bar spindle assembly wherein the lubricant is introduced preferably once during a season of operation and wherein a novel sealing arrangement is provided for retaining the lubricant and keeping it free and clear of contamination.

Another object of the invention is to provide a novel sealing and locking arrangement for the cotton picker spindle with respect to its associated nut structure.

A still further object of the invention is to provide a novel seal between the spindle and the outer end of the nut structure such that the seal is compressed in the assembly of the parts and has a novel transverse section functioning to entrap the lubricant and retain it in the bearing assembly and at the same time seal the bearing against the entry of dirt, and further, the seal functioning as a retarder for controlling the rotation of the spindle to control backlash in the mating between the teeth of the spindle and the gear on the drive shaft.

A still further object of the invention is to provide a novel shield and spindle structure, the shield being radially split and snapping within a groove in the spindle shank portion and providing a backing for the seal which ensleeves the spindle with a tight fit such as permits rotation of the spindle, the sleeve having a lip structure which in the relaxed position together with the body of the seal is dimensioned larger than the space between the shield and the associated bearing so that in the compressed or assembled position between the nut and the shield, the lip structure is caused to turn inwardly and provide an annular cavity or groove affording an oil reservoir for any oil which tends to seep out of the bearing.

A further object of the invention is to provide a novel spindle sealing assembly and spindle structure such that the spindle is accommodated slight movement inward with respect to the picker bar wtih consequent deformation of the seal whereby the oil cavity in the seal is caused to pump the oil inwardly into the bearing.

These and other objects and advantages inherent in and encompassed by the invention will become more readily apparent from the specification and the drawings wherein:

FIGURE 1 is an elevational view of the conventional cotton picker drum with the invention applied thereto, some parts being broken away and shown in section;

FIGURE 2 is a fragmentary enlarged sectional view of the novel spindle and nut assembly;

FIGURE 3 is a fragmentary sectional view of the seal shown in relaxed position; and FIGURE 4 is an end view of the spindle and nut assembly.

Describing the invention in detail and having particular reference to the drawings there is shown a conventional cotton picker, generally designated 2, comprising an upper drum head housing 3 within which is contained the drive mechanism generally indicated 4, for the picker drum 5, said mechanism including a shaft 6 carried on a bearing 7 from the upper wall 8 of the head portion 3, the shaft being connected at its lower end to the upper end or cap 9 of the picker drum 5. The shaft 6 is driven by a sprocket 11 keyed thereto. It will be understood that in lieu of the aforementioned drive that the drive may be such as shown in U.S. Patent 2,821,832, and that the drive herein shown is merely exemplary and is merely environmental insofar as the invention is concerned. The drum provides a peripheral oscillatory support, as at 12 and 13, for the upper and lower ends of the hollow, vertical support picker bar or tube 14. It will be understood that there are anywhere from twelve to sixteen such bars in each drum in the present pickers. Each bar or support 14 is provided with a vertical series of generally horizontal hollow hubs or holders 15, each of which opens into the internal bore 16 of the tube. The hubs are internally threaded and each receives a cylindrical threaded nut portion 17' therein of a nut 18, the nut having a generally horizontal bore 17 therein into which are socketed axially spaced cylindrical outer and inner bushings 19 and 20 through which journals a cylindrical bearing surface 20' on the shank portion 21 of a picker spindle 21a. The outer end of the shank portion is continued into a picker cone 22 and the inner end is provided with a bevel gear 23 which bears at its outer side 24 against an outturned flange 25 on the inner end of the bearing 20. The bearing 20 has a bore 26 receiving the shank portion 21 of the picker spindle 21a therein and has an outer end spaced axially inwardly from the inner end of the bearing 19 and defining an annular reservoir chamber 27 therewith.

The bevel gears 23 at the inner ends of the cotton picker spindles are driven from companion bevel gears 29 connected to a shaft 30 which extends through the bore 16 and is mounted in a plurality of bearings 31 and 32. The shaft 30 is provided with a spur gear 33 at its upper end and driven by a gear 34 which is connected to a sleeve 35 which is sleeved over the shaft 6 and connected to a driving sprocket 36.

The present invention envisions the lubrication of the gears 23 and 29 as well as the bearings 31 and 32 and also the bearings 19 and 20 in a sealed system. As best seen in FIGURES 2 and 3, the outer end 37 of the nut 18 is provided with an outwardly axially projecting annular flange 38 which opposes and is slightly spaced from the axial edge 41 of an annular flange 42 which is spaced slightly radially inwardly from the internal surface 43 of flange 38, and radial surface 40 on sleeve 37, the said flange 42 being formed on the inner side of a generally conically shaped combination retainer and shield member generally designated 44. The shield member 44 presents an external generally conical surface 45 which approximates the taper of the chamfer edge surface 46 on the outer end of the flange 38 and is effective to shed cotton which winds on the picker portion 22 of the cotton picker spindle 21a. The shield and retainer member 44 provides an internal axially extending surface 47 on the inner side of the annular flange 41 and this surface merges into a generally frusto-conical surface 48 which is tapered outwardly of the supporting hub 18 toward the picker portion 22 of the spindle 21a. The surface 48 merges at its reduced forward end or extremity into a radially extending surface 49 which leads to the inner periphery 50 of the shield, said periphery 50 defining the outlines of a bore of the shield which admits the reduced section 52 of the spindle, the section 52 being disposed between the shank portion 21 and the picker portion 22 and providing an annular groove 53 which admits the body portion 54 of the shield which is sprung to and maintains hoop tensions so that its periphery 50 snugly and tightly engages the periphery 55 of the reduced section 52, the body portion 54 being dimensioned so that the toe end 56 of the body portion engages the shoulder 53 and the heel end 57 of the body portion engages the shoulder 58. It will be realized from a consideration of FIGURE 4 that the shield and retainer element is slit radially as indicated at 60, FIGURE 4, and that in application to the spindle or removal therefrom it is adapted to be circumferentially enlarged in the nature of a snap ring in order to sleeve onto and off the picker portion 22 in its entry and exit with respect to the groove 53.

As best seen in FIGURE 3, the seal generally designated 65 is of elastomer material and in essence is a ring or an annular structure and having an axial internal bore 66 snugly admitting with a stretch fit the journal portion 21 of the cotton picker spindle to provide a seal therewith but accommodating relative rotation between the same, the bore 66 being formed in the body portion 67 of the sealing member which has an annular radial surface 68 complemental to surface 49 on the heel end 57 of the body portion 54 of the shield and fitting thereagainst, the surface 68 extending from the bore 66 and merging into a generally frusto-conical surface 69 on the outer periphery of the body portion 67, said surface 69 being substantially complemental to the surface 48 on the shield and seating thereagainst. The surface 69 at its broad or divergent extremity merges into a convex or arcuate surface 70 which engages the surface 47 on the annular flange portion 41 on the shield. The surface 70 is formed on an axially outwardly extending lip portion 71 which together with the body portion 67 is of an axial dimension greater than the spacing between the surface 49 on the shield and the opposing radial surface 72 on the outer end of the bearing 19 which terminates at the focal end of a frusto-conical surface 73 formed on the nut at the outer end of the bore 17, the surface 75 guiding the pointed nose edge 76 of the lip portion 71 as it is axially aligned therewith in the pre-assembly position of the seal so that the lip is caused to deform in a curve directed inwardly toward the spindle, and the portion of the surface 70 adjacent to the sharp end 76 is caused to seat firmly against the surface 72 while the seal 65, which is formed of an elastomer material such as neoprene or rubber-like material, is maintained under compression between the shield and the support structure which includes the nut 18 and the bearing 19. It will be seen that in the relaxed position of the seal that the internal periphery of the seal which is in radial alignment with the lip portion is defined by a cylindrical surface or periphery 78 which extends from the sharp edge 76 of the body portion and on the inner side of the body portion merges into an arcuate or concave surface 79 which continues to the periphery of the bore 66.

It will be seen that in the compressed or operating position of the seal that the lip structure 70 is so deformed as to provide an outwardly convexed groove 79' which extends about the spindle and provides a reservoir for oil or grease with which the bearing as well as the chamber 27 have been prefilled.

A further feature of the invention is that inasmuch as the shield is spaced axially from the surface 40 that the picker spindle is accommodated slight axial play. Thus in view of the preselected clearance or tolerance between the teeth of the gears 23 and the mating gears 29, the spindle is accommodated slight inward and outward movement, as is well understood by those skilled in the art. When the spindle is projected into the cotton plant and subjected to endwise inward loading, the spindle tends to move inwardly with consequent over-compression of the sealing material and thus reducing the capacity of the reservoir 79' so that there is a pumping action from the reservoir 79' to the space between the spindle surface and the periphery of the bore of the bearings 19 and 20 thus moving the lubricant back and forth between the contacting surfaces inasmuch as upon expansion the lubricant is sucked back into the reservoir or concavity 79'. The centrifugal forces as well as the inherent flexbility tend to urge the portion 71 radially outwardly maintaining its sealing engagement.

Thus it will be seen that a novel interlocking relationship is obtained between the spindle and the shield and between the spindle and the holder therefor through the resilient action or compression of the seal which also functions to control backlash between the gears by resisting the free rotation of the spindle and maintaining the gears in proper mating relationship.

Having thus described a preferred embodiment of the invention, it will be understood that other forms will become readily apparent to those skilled in the art within the scope of the appended claims.

What is claimed is:

1. A cotton picker spindle mounting comprising a picker bar, a drive shaft rotatably mounted therein, a driving bevel gear connected thereto for rotation thereby, a holder mounted on the bar and extending angularly therefrom, bearing means in the holder, a cotton picker spindle having a shank journalled in said bearing means, a driven bevel gear connected to said shank, said driven gear and bearing means engaging along complementary surfaces, and sealing means carried by said spindle in sealing engagement with said holder and urging said spindle in a direction engaging said surfaces.

2. The invention according to claim 1 and shield means mounted upon the spindle and telescoped with respect to said holder and compressing said sealing means between the same and the holder.

3. The invention according to claim 1 and said sealing means comprising a ring of elastomer material having portions forming in the compressed state of the ring a lubricant reservoir open to said shank.

4. The invention according to claim 1 and said sealing means comprising a ring of elastomer material having portions forming in the compressed state of the ring a lubricant reservoir open to said shank, shield means about the shank and said shield means and holder being axially spaced and said spindle being movable within the limits of said spacing and flexing said ring and varying the capacity of the reservoir.

5. The combination of a support having a cylindrical generally horizontal bore therein; a rotatable picker member having its axis of rotation coincident with the axis of said cylindrical bore and including an exterior cylindrical bearing surface concentrically within and encircled by the bore; a pair of coaxial tubular bushings having outer cylindrical bearing surfaces fitting the bore, and interior cylindrical bearing surfaces journalling the rotatable member via its bearing surface, said bushings having proximate end portions coaxially spaced apart within the bore to provide an annular recess defined by said end portions and by a portion of the interior of the bore and by a portion of the exterior bearing surface of said member; said member having a surface engaging the outer end of one of said bushings; means mounted on the member and including resilient sealing means in abutment with the outer end of the other bushing.

6. In a cotton picker, the combination of a holder having a substantially horizontal bore, and having an outer end with an annular flange defining an outwardly open groove, a picker spindle journalled in the bore, said spindle having a peripheral groove outwardly of the holder, and a snap ring shield structure engaged within the peripheral groove and telescoped into said axial groove, said shield structure rotatable with the spindle.

7. The invention according to claim 6 and a sealing member compressed between said shield structure and the hollow and confined axially and radially therebetween.

8. In a seal for a cotton picker spindle of the type having a shank and a holder journalling the spindle via the shank, a shield mounted on the shank and having an annular cavity facing the holder, and an annular sealing element confined in the cavity and surrounding the shank and compressed between the shank and shield and between the shield and holder, and said element having a lip portion extending axially in its unstressed state and deformed in its compressed state to form a lubricant reservoir open to the shank.

9. The combination of a holder, a cotton picker spindle journalled therein, said holder having an outer end, a shield on the spindle opposing said end, a sealing ring element interposed between said holder and shield and embracing said spindle in sealing engagement therewith, and said element having a portion deformed to provide an annular lubricant chamber open to the spindle.

10. The invention according to claim 9 and said portion being centrifugally expandable into engagement with the adjacent surfaces of said holder and shield.

References Cited in the file of this patent

UNITED STATES PATENTS

| | | |
|---|---|---|
| 2,497,776 | Kallgren | Feb. 14, 1950 |
| 2,713,239 | Dermid | July 19, 1955 |
| 2,785,524 | Hubbard | Mar. 19, 1957 |
| 2,856,744 | Barbknecht et al. | Oct. 21, 1958 |
| 2,876,612 | Walker et al. | Mar. 10, 1959 |